United States Patent [19]
Bennett et al.

[11] Patent Number: 5,249,465
[45] Date of Patent: Oct. 5, 1993

[54] ACCELEROMETER UTILIZING AN ANNULAR MASS

[75] Inventors: Paul T. Bennett, Phoenix; William C. Dunn, Mesa, both of Ariz.

[73] Assignee: Motorola, Inc., Schaumburg, Ill.

[21] Appl. No.: 626,133

[22] Filed: Dec. 11, 1990

[51] Int. Cl.⁵ .............................................. G01P 15/13
[52] U.S. Cl. .................................. 73/510; 73/517 B; 73/517 A
[58] Field of Search ................ 73/517 B, 517 R, 514, 73/517 A, 510; 361/280

[56] References Cited

U.S. PATENT DOCUMENTS

| | | | |
|---|---|---|---|
| 3,498,138 | 3/1970 | Stewart | 73/517 B |
| 4,306,456 | 12/1981 | Maerfeld | 73/517 B |
| 4,736,629 | 4/1988 | Cole | 73/517 R |

Primary Examiner—John E. Chapman
Attorney, Agent, or Firm—Joe E. Barbee

[57] ABSTRACT

An accelerometer in which the seismic mass is formed in the shape of an annulus. The annular shape allows twisting motions as well as displacement of the seismic mass to be sensed and restoring electrostatic forces applied. This allows the supporting spring to be made extremely weak avoiding the mechanical limitations of springs.

7 Claims, 3 Drawing Sheets

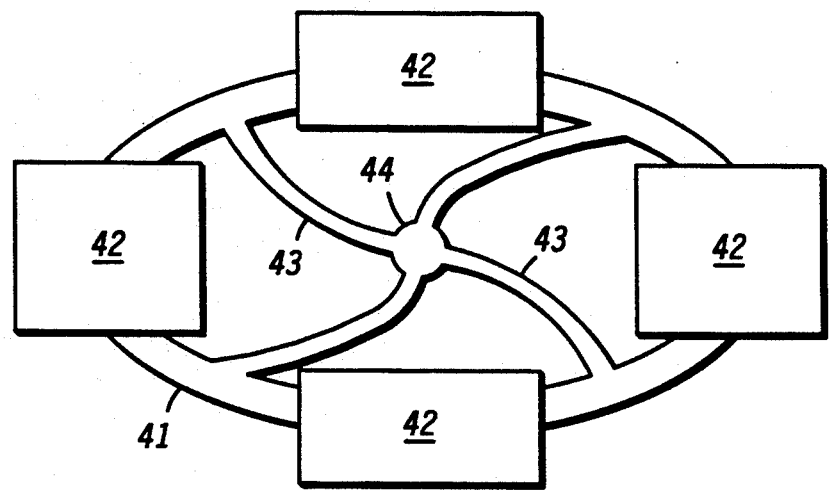
*FIG. 4*
*FIG. 5*
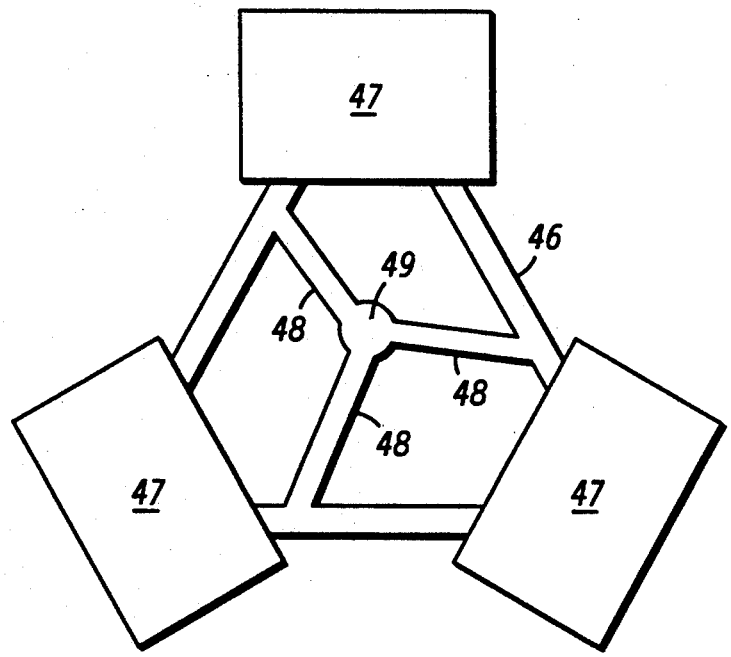

ACCELEROMETER UTILIZING AN ANNULAR MASS

BACKGROUND OF THE INVENTION

The present invention relates, in general, to micromachined capacitance type accelerometers, and more particularly to annular mass accelerometers using electrostatic forces to position the annular mass.

Accelerometers are generally based on the principle of a seismic mass suspended in some way by a spring system, with acceleration being measured indirectly by measuring displacement of the seismic mass from a neutral position. Sensitivity of the accelerometer, that is to say the displacement for a given acceleration, depends on two quantities: the size of the seismic mass and the strength of the spring. The seismic mass can easily be made to remain stable indefinitely but the strength (modulus of elasticity) of the spring may vary, changing the displacement of the seismic mass for a given acceleration and making the accelerometer lose accuracy or in extreme cases making the accelerometer unserviceable.

There are numerous factors which can cause a spring to change its characteristics, a few of these are: fatigue of the material due to flexure, deformation due to being kept under stress, changes in strength and size due to temperature changes, non-linear strength changes as displacement of the mass increases, and deformation or breakage by transient stresses from a shock. These factors may be minimized by the correct selection of spring material and by careful design of the spring itself, but they are significant to some degree in every apparatus that depends on a spring for its operation. Eliminating the shortcomings of the spring would greatly enhance the design of an accelerometer in just about every way.

Micromachined accelerometers have made it possible to reduce the effect of the spring by using more easily manipulated electrostatic forces instead. Previous approaches have used a single block as a seismic mass; however it is extremely hard to control twisting effects with an electrostatic control system using this geometry for the seismic mass. As a result, the mechanical spring strength must still be a significant factor in operation of the accelerometer with the electrostatic forces being used primarily for a damping effect to reduce excessive motion of the seismic mass.

SUMMARY OF THE INVENTION

Briefly stated, the present invention provides an accelerometer in which the effects of a spring supporting a seismic mass are minimized by relying on electrostatic forces rather than the mechanical spring action to position the seismic mass. Due to the geometry of the invention, the mechanical spring is required only for electrical coupling to the mass and as a means to hold the mass in position laterally. Twisting of the mass is controlled electrostatically by means of multiple sets of electrodes around the mass.

BRIEF DESCRIPTION OF THE DRAWINGS

FIG. 4 depicts a top view of an annular accelerometer utilizing an elliptical mass; and FIG. 5 shows a top view of an annular accelerometer utilizing a triangular mass.

DETAILED DESCRIPTION OF THE DRAWINGS

Figure 1:
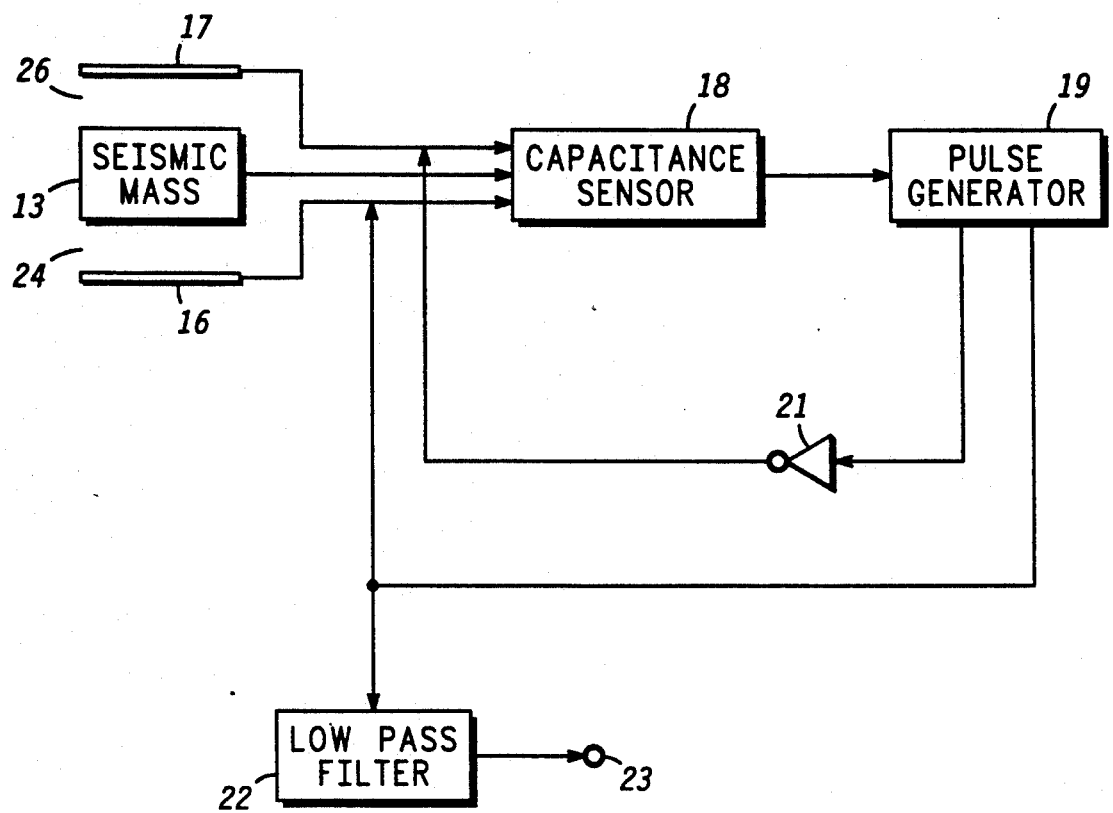
FIG. 1 depicts a functional block diagram of a typical position detector and electrostatic control system according to the prior art.

FIG. 11 is a functional block diagram of a typical position detector and electrostatic control system according to the prior art. The system uses a pulse width modulation scheme both to sense the position of seismic mass 13 and to apply an electrostatic force to keep seismic mass 13 in position. Systems typical of the prior art are detailed in S. Suzuki et al, "Semiconductor Capacitance-type Accelerometer with PWM Electrostatic Servo Technique", Sensors and Actuators, A2-1-A23 (1990), copyright Elsevier Seqoia, pages 316 to 319, and in H. Leuthold et al, "An ASIC for High-resolution Capacitive Microaccelerometers", Sensors and Actuators, A21-A23 (1990), copyright Elsevier Seqoia, pages 278 to 281, which articles are hereby incorporated herein by reference.

A capacitance sensor 18 is electrically coupled to electrodes 16 and 17 as well as to seismic mass 13. Capacitance sensor 18 senses the spacing between electrode 16 and seismic mass 13 relative to the spacing between electrode 17 and seismic mass 13 by sensing the ratio of the value of capacitor 24 to the value of capacitor 26. A voltage proportional to the ratio of the two capacitors is coupled to the input of a pulse width modulated pulse generator 19. Pulse generator 19 produces a train of pulses at a constant repetition rate with a pulse width that is proportional to the input voltage. This pulse train is then coupled to electrode 16, and also inverted by inverter 21 then coupled to electrode 17. Since the pulse width of the pulses is proportional to the motion of seismic mass 13 and has a polarity which produces a force opposing the direction of motion, an electrostatic force is applied to seismic mass 13 which will restore seismic mass 13 to its original position. Integrating the pulse train with a low pass filter 22 produces an output voltage at a terminal 23 that is proportional to the acceleration applied to the system.

Examination of the geometry of seismic mass 13 shows that if seismic mass 13 twists about its center, one end of seismic mass 13 will draw closer to electrode 17 and the opposite end of the same surface will draw away by the same amount. The result is no net change in the capacitance of capacitor 26. The same thing occurs between seismic mass 13 and electrode 16, so neither of the two capacitors 26 and 24 change in value. As a result the position detector and electrostatic control system is unable to detect or control twisting motion in seismic mass 13.

Figure 2:
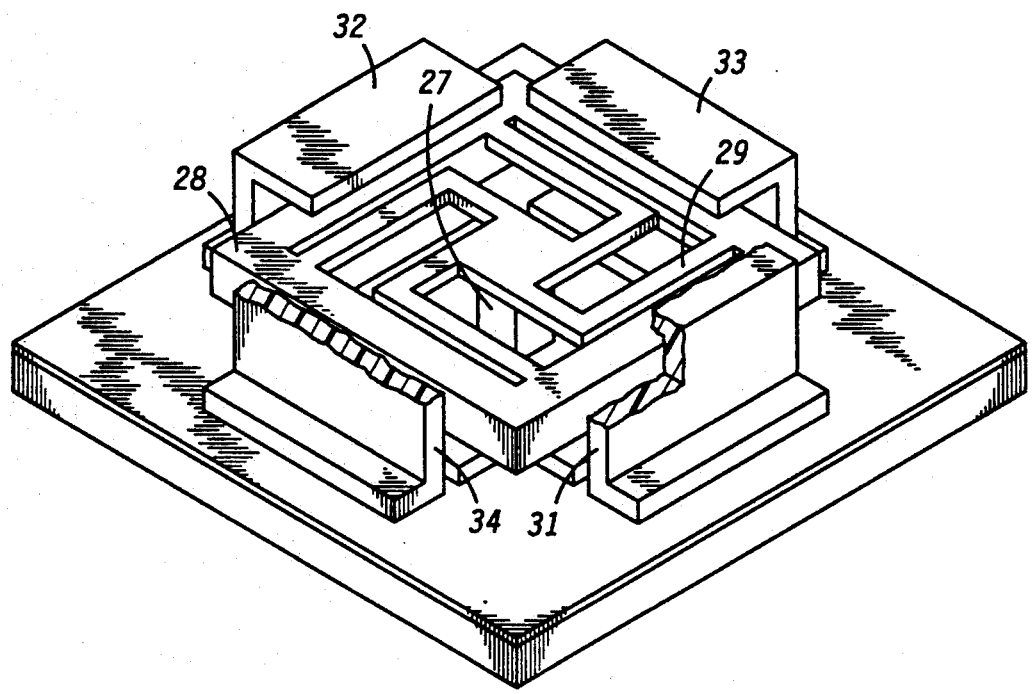
FIG. 2 depicts a top view of an annulus accelerometer as a preferred embodiment of the present invention.

FIG. 2 depicts a top view of an annulus accelerometer as a preferred embodiment of this invention. A seismic mass 28 in the form of an annular rectangle is coupled mechanically and electrically to a central pedestal 27 by a plurality of support arms or springs 29. Springs 29 are fabricated as a long arm in the shape of a spiral to produce a mechanically weak spring. This arrangement allows vertical motion freely, but provides some support laterally to minimize shock effects. In a preferred embodiment of this invention, seismic mass 27, springs 29 and pedestal 27 are manufactured from a single piece of polycrystalline silicon by methods well known in the micromachining arts.

An electrode pair consists of a matched pair of electrodes, one electrode placed above seismic mass 28 and one below seismic mass 28 so as to form a pair of capacitors similar to capacitors 24 and 26 (FIG. 1). Electrode pairs are positioned on each side of annular rectangular seismic mass 28. A first top electrode 31 is positioned opposite a second top electrode 32 on a first axis, and a third top electrode 33 is positioned opposite a fourth top electrode 34 on a second axis. The matching lower electrodes of the electrode pairs are not visible in FIG. 2. This symmetrical arrangement of electrode pairs provides an inherently balanced system for acceleration forces, for gravitational forces, and for electrostatic forces.

While a square annulus is the preferred embodiment, other shapes for the annulus are believed to have advantages for certain applications. Triangular, elliptical, and circular shapes in particular allow direct measurement of twisting moments along non-perpendicular axes. It is believed that other embodiments may benefit from an asymmetrical arrangement of seismic mass 28 and the positions of electrode pairs around the periphery so as to produce a predetermined difference in sensitivity to acceleration in different modes and directions.

Figure 3:
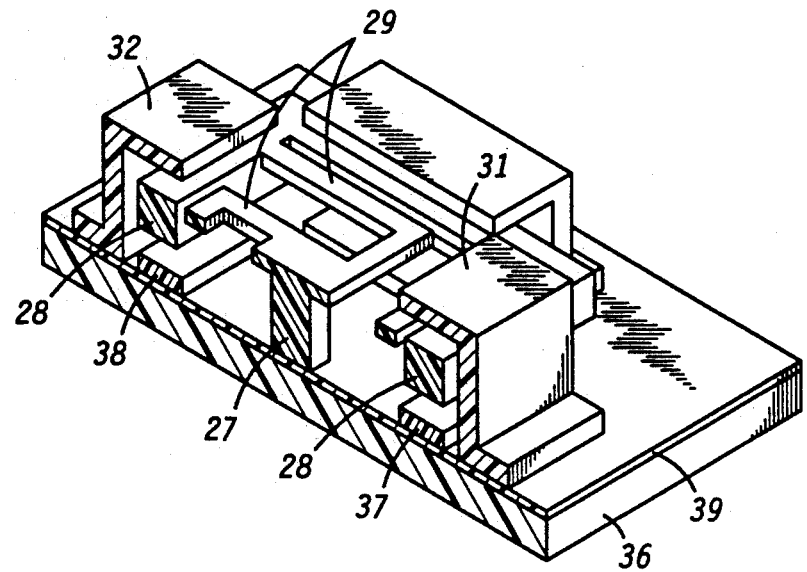
FIG. 3 depicts a side view cut through the center of the accelerometer of FIG. 2.

FIG. 3 depicts a side view cut through the center of an annulus accelerometer as a preferred embodiment of this invention. A substrate 36 supports central pedestal 27, which in turn is coupled electrically and mechanically to seismic mass 28 by spring 29. Top electrode 31 is positioned above one side of seismic mass 28 and is paired with a lower electrode 37 positioned below the same side. Likewise top electrode 32 is positioned on the opposing side of seismic mass 28 and is paired with a lower electrode 38. Only two of the four electrode pairs can be seen in the cross-sectional view of FIG. 3. Electrodes 31, 32, 37, and 38 together with pedestal 27 are electrically isolated from substrate 36 and from each other by an oxide layer 39 or the like.

Consider for the moment a first electrode pair formed by electrode 31 and electrode 37 positioned on the right-hand side of seismic mass 28. Electrode pair 31 and 37 together with seismic mass 28 are electrically coupled to a position detector and electrostatic control system similar to that shown in FIG. 1. An accelerating force is applied to substrate 36 so as to move substrate 36 in an upward direction perpendicular to substrate 36. Since spring 29 is too weak to exert significant force, seismic mass 28 remains stationary and substrate 36 moves closer to seismic mass 28. This motion causes the capacitance between electrode 37 and seismic mass 28 to increase and the capacitance between electrode 31 and seismic mass 28 to decrease. These changes in capacitance are detected by capacitance sensor 18 (FIG. 1) and causes the position detector and electrostatic control system to apply a correcting voltage to electrodes 31 and 37 relative to the voltage of seismic mass 28. This voltage produces an electrostatic force acting to return the right-hand side of seismic mass 28 to a neutral position relative to electrodes 31 and 37.

FIG. 4 depicts a top view of an annular accelerometer utilizing an elliptical mass 41 as an alternate embodiment in accordance with the present invention. Elliptical mass 41 is shaped as an elliptical annulus, coupled mechanically and electrically to a central pedestal 44 by a plurality of springs 43. A plurality of electrode pairs 42 are positioned around the circumference of elliptical mass 41.

FIG. 5 depicts a top view of an annular accelerometer utilizing a triangular mass 46 as an alternative embodiment in accordance with the present invention. Triangular mass 46 is shaped as a triangular annulus, coupled mechanically and electrically to a central pedestal 49 by a plurality of springs 48. A plurality of electrode pairs 47 are positioned at the vertices of triangular mass 46.

Each of the three remaining electrode pairs is also coupled to its own position detector and electrostatic control system which acts to maintain its respective side of seismic mass 28 in a neutral position. Together the four position detector and electrostatic control systems detect and correct any motion due to twisting or acceleration by each system maintaining the appropriate side in a fixed position relative to substrate 36. The result is four independent output signals which may be summed to provide a measure of acceleration perpendicular to the plane of the substrate or may be further processed to provide measures of the twisting moments in the two axes laying in the plane of the substrate.

An annulus shape for the seismic mass of an accelerometer facilitates detection of twisting moments by concentrating the mass at the outer edges of the seismic mass. This overcomes a major problem associated with electrostatic position control of an accelerometer mass allowing the detrimental effects of a mechanical spring to be eliminated.

We claim:

1. An accelerometer utilizing an annular mass, comprising:
   a silicon substrate;
   at least one supporting pedestal mounted on the silicon substrate;
   a mass configured in the shape of an annulus positioned so as to surround the pedestal;
   a plurality of electrode pairs mounted on the silicon substrate such that one member of each electrode pair is above the annular mass and another member of the electrode pair is below the annular mass, the electrode pairs being located around the periphery of the annular mass such that the annular mass may be positioned by electrostatic forces from the electrode pairs;
   a plurality of electrostatic control means, each electrically coupled to the annular mass and a predetermined electrode pair, for applying an electrostatic force to restore the mass to a neutral position by applying an electrostatic restoring voltage to the electrode pair; and
   at least one supporting spring which mechanically centers and electrically couples the supporting pedestal to the annular mass but which does not significantly modify the effect of the electrostatic forces.

2. The accelerometer utilizing an annular mass of claim 1 wherein the annular mass is formed as a rectangular annulus with a plurality of electrode pairs positioned along each of the sides of the annular mass, such that the accelerometer has a predetermined difference in sensitivity to rotational acceleration around the two axes of rotation which are parallel to the substrate perpendicular to a two adjacent sides of the rectangle, and pass through the center of the rectangle.

3. The accelerometer utilizing an annular mass of claim 1 wherein the annular mass is formed as a triangular annular with a plurality of electrode pairs positioned along each of the sides of the annular mass.

4. The accelerometer utilizing an annular mass of claim 1 wherein the annular mass is formed as an elliptical annulus such that the accelerometer will exhibit a predetermined difference in sensitivity to rotational acceleration around each axis of the ellipse, the accelerometer having a plurality of electrode pairs positioned around the circumference of the annular mass.

5. A solid-state accelerometer, comprising:
a substrate;
a support positioned on the substrate;
a mass having at least one supporting arm attached to the support, the mass having a rectangular annular configuration surrounding the support;
capacitive plates positioned on the substrate along each side of the rectangle for sensing position of the mass and for applying a restoring electrostatic force to the mass; and
an electronic circuit coupled to the capacitive plates for sensing the position of the mass and for applying a restoring electrostatic force.

6. A method for positioning a seismic mass within a accelerometer, comprising:
providing a silicon substrate having a top surface:
mounting a pedestal on the silicon substrate;
providing a seismic mass having the shape of a rectangular annulus;
positioning the seismic mass by means of a spring so the seismic mass surrounds the pedestal, the spring allowing the seismic mass to move freely in a direction perpendicular to the silicon substrate;
mounting a plurality of electrode pairs on the silicon substrate such that one member of each electrode pair is above the mass and another member of the electrode pair is below the mass, the electrode pairs being positioned on each side of the seismic mass such that the annular mass may be positioned by electrostatic forces from the electrode pairs, and further that motion perpendicular to the silicon substrate causes a change in capacitance between the electrode pairs and the seismic mass;
sensing the change of capacitance between each electrode pair and the seismic mass due to motion of the seismic mass;
generating an electrical restoring voltage which is proportional to motion of the seismic mass along a predetermined plane; and
applying the electrical restoring voltage to the electrode pairs which position the seismic mass along a predetermined plane.

7. The method for positioning a seismic mass within an accelerometer of claim 6, wherein a first electrode pair and a second electrode pair are mounted such that a twisting motion will cause the change in capacitance between the first electrode pair and the seismic mass to be substantially equal and opposite to the change in capacitance between the second electrode pair and the seismic mass.

* * * * *

UNITED STATES PATENT AND TRADEMARK OFFICE
CERTIFICATE OF CORRECTION

PATENT NO. : 5,249,465
DATED : October 5, 1993
INVENTOR(S) : Paul T. Bennett and William C. Dunn It is certified that error appears in the above-indentified patent and that said Letters Patent is hereby corrected as shown below:

In column 4, line 67, claim 2, please delete the word "annular" and insert therefor --annulus--.

Signed and Sealed this

Twenty-third Day of August, 1994

Attest:

BRUCE LEHMAN

Attesting Officer      Commissioner of Patents and Trademarks